EDWARD A. ARCHIBALD.
Improvement in Machine for making Wheels.
No. 122,349. Patented Jan. 2, 1872.
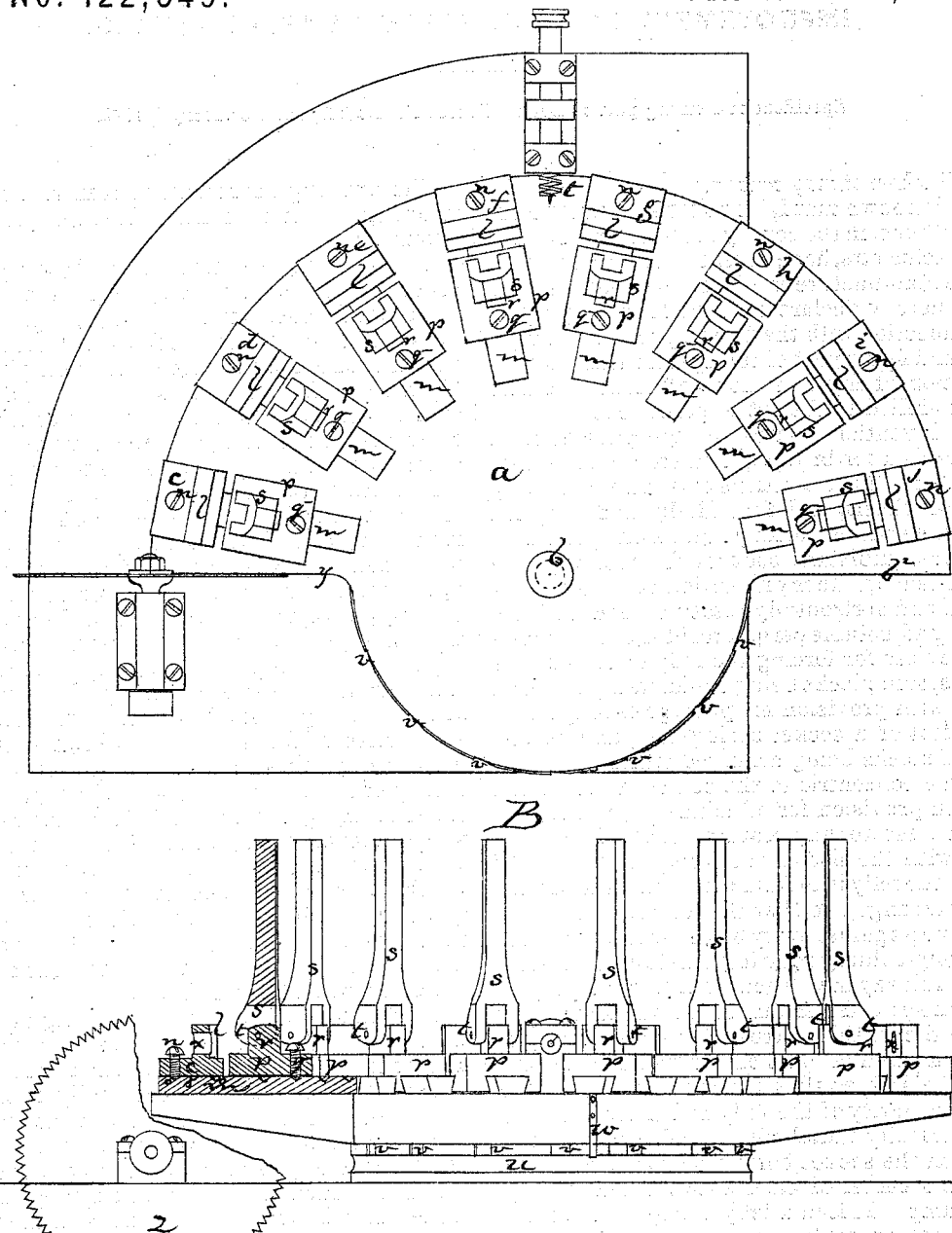
Witnesses
M. W. Frothingham.
L. H. Latimer
E. A. Archibald.
By his Attys.
Crosby & Gould 122,349

UNITED STATES PATENT OFFICE.

EDWARD A. ARCHIBALD, OF METHUEN, MASSACHUSETTS.

IMPROVEMENT IN MACHINES FOR MAKING WHEELS.

Specification forming part of Letters Patent No. 122,349, dated January 2, 1872.

*To all whom it may concern:*

Be it known that I, EDWARD A. ARCHIBALD, of Methuen, in the county of Essex and State of Massachusetts, have invented an Improvement in the Manufacture of Wheels for Vehicles; and I do hereby declare that the following, taken in connection with the drawing which accompanies and forms part of this specification, is a description of my invention sufficient to enable those skilled in the art to practice it.

My invention relates to an organization of mechanism for bringing to a true semicircular form bent fellies or strips of wood for forming rims of wheels, and for radially trimming the opposite ends of the felly and forming in it regular or equidistant sockets for receiving the spoke-tenons. In my invention I employ a horizontal and horizontally-rotative wheel or table having adjustable peripheral blocks and clamping devices for forcing the felly up against the blocks, said blocks being equidistant, and each made with provision for passage through it of the point of a socket-boring tool, and the series of blocks being arranged either in a fixed position concentric to the center of the wheel, or with provision for adjustment, so that they may be set to any required circle, in accordance with the size of the wheel, of the rim of which the felly is to form a half, and the clamps being arranged so that the felly can be forced tightly up against every block; combining with this felly-holding rotating wheel a boring-tool and a railway saw (each standing radially to the wheel) and certain stopping devices, by which the wheel is arrested when each end of the semicircular part of the table is in line with the saw, so that the saw establishes the semicircularity of the felly and trims each end to a perfectly radial plane, and is also arrested when the socket-boring tool is in radial line with the center of each successive felly-griping clamp. It is in a felly-clamping and shaping-wheel or table, and in the combination therewith of a cutting-off saw and a socket-boring tool, that my improvements consist, the felly-holding wheel being mounted so as to rotate upon a center-pin or shaft, and having devices by which it may be arrested in position for boring the spoke-tenon sockets in proper respective position, and the opposite ends of the felly into position for trimming them off to radial faces.

The drawing represents in plan and in sectional elevation a mechanism embodying the invention.

*a* denotes the wheel or table turning on a center-pin, *b*. *c d e f g h i j* denote a series of head-blocks, each formed with an upright, *l*, as seen at B. These blocks are fastened in position, and may be removably and adjustably fixed to the top of the table, or may be permanent attachments integral with the table, if desirable. In either case the centers of the inner faces of all the blocks are to be exactly concentric to the center of the wheel. When the apparatus is intended for making fellies for but one size of wheel the blocks are preferably fixed or permanent, but for fellies for different wheels they must of course be adjustable. When adjustable they are made as slides mounted upon radial guides *m*, each slide having a suitable fastening-screw, *n*, for securing it in position, the guide being preferably provided with equidistant countersunk holes, *o*, each series of holes in the respective guide-pieces being concentric to the center-pin *b*. On each guide *m* is an adjustable slide, *p*, which slides on the guide, and is fastened in position with reference to the adjacent block by a screw, *q*. On top of each slide is a projection, *r*, to which is pivoted a cam-lever or eccentric-lever, *s*, the cam projection *t* of which is thrown forward toward the upright *l* when the lever is thrown into upright position, and back from the block when thrown down.

The head-blocks *c d e f g h i j* being all concentrically placed in accordance with the diameter of the wheel to be made, and the levers *s* being thrown back, the bent felly is introduced between the uprights *l* and the levers, its ends extending beyond the two outer blocks. The slide-blocks being brought up as near the felly as is practical and fastened in position the levers are turned one by one, and the felly is thereby clamped tightly against the uprights *l*, its outer surface being of course in the circle concentric to the center of the wheel. The felly is then ready to be bored. *t* denotes the boring-tool or bit, arranged in a stand with its axis in a radial line with the wheel, the tool having radial and rotary movements, but no other movement in boring. The wheel *a* is supported upon a circular plate, *u*, provided with a series of equidistant peripheral notches, $v$, and the table $a$ has a spring-tooth, $w$, extending down over and bearing against the periphery of this plate. The felly having been clamped, the wheel is turned so as to bring the first head-block opposite to the boring-tool, and when the tool is exactly in axial line with the center hole $x$ of the upright $l$ the spring $w$ will spring into one of the notches $v$, and the table will then be in position for the boring-tool to advance, its point passing through the hole $x$ into and through the felly, making a perfectly radial socket or tenon-hole. The boring-tool being then slid back, the table is again turned, and when the next block is opposite to the borer the spring flies into the next notch, holding the table in position for the next socket to be bored in the felly, and so on until all the tenon-holes are bored. When (as the wheel is turned) the side $y$ of the table is brought into line with the saw $z$ the spring flies into an auxiliary notch, and the saw-carriage is then thrown forward and cuts off the end of the felly-strip, leaving a radial face upon the end of the clamped strip; and when the wheel is turned so as to bring the opposite side $b'$ of the wheel into line with the saw the spring flies into another auxiliary notch, and, the saw-carriage being thrown forward, the opposite end of the clamped felly-strip is faced, the felly being then a true semicircular ring bored with tenon-sockets, which must be in proper position for the reception of the spoke-tenons whenever the two fellies and the spokes are brought together.

The inner blocks may be the stationary blocks, and the outer ones be brought up to the felly, the outer blocks in such case having the clamping-levers or equivalent clamping devices; and, instead of the levers $s$, any suitable clamping mechanism may be employed. The table may be provided with any number of clamping-blocks, in accordance with the number of spokes the wheel is to possess.

The boring-tool is shown as mounted in a stationary frame or housings, but in practice this frame will be made vertically adjustable to center the boring-tool with reference to varyingly thick fellies.

Claims.

1. I claim the felly-bending and holding-table or wheel, arranged to turn upon a center, and having a semicircular series of concentrically-located blocks, against which the felly is clamped throughout its length to bring it to a true semicircular shape for the formation of the spoke-tenon sockets, as set forth.

2. Also, the stationary blocks $c\ d\ e\ f\ g\ h\ i$ and the adjustable slides $p$, provided with clamping-levers, arranged substantially as described.

3. Also, the combination, with such felly-clamping turn-table and its semicircular series of clamps, of the boring-tool, arranged in radial line with the table, and which, as the felly is turned, enters a guide-hole, $x$, in uprights $l$, and bores successively a series of spoke-tenon sockets.

4. Also, in combination with the rotary felly-clamping-wheel, the radially-arranged saw, substantially as described.

5. Also, in combination with the rotary table and its series of clamping-blocks, and with the boring-tool or the radially-arranged saw, or with both, the described mechanism for arresting the movement of the table and bringing it to a stop in proper position for the operations either of the saw or of the boring-tool.

E. A. ARCHIBALD.

Witnesses:
FRANCIS GOULD,
M. W. FROTHINGHAM. (31)